United States Patent [19]
Frye et al.

[11] 3,840,155
[45] Oct. 8, 1974

[54] NUCLEAR FUEL HANDLING POWDER CONTAINER

[75] Inventors: James A. Frye, Oklahoma City; Ralph B. Morton, Dell City, both of Okla.

[73] Assignee: The Boardman Company, Oklahoma City, Okla.

[22] Filed: Apr. 18, 1972

[21] Appl. No.: 245,215

[52] U.S. Cl. .................................. 222/195, 222/196
[51] Int. Cl. ........................................... B65d 83/06
[58] Field of Search ........... 222/195, 196, 200, 227; 302/59

[56] References Cited
UNITED STATES PATENTS

| | | | |
|---|---|---|---|
| 2,560,480 | 7/1951 | Rogers et al. | 222/200 |
| 3,097,828 | 7/1963 | Grun | 222/195 X |
| 3,166,222 | 1/1965 | Schrader | 222/195 |
| 3,217,943 | 11/1965 | Atwood | 222/195 X |
| 3,232,494 | 2/1966 | Poarch | 222/196 X |
| 3,667,814 | 6/1972 | Krivda | 302/59 |

Primary Examiner—Stanley H. Tollberg

[57] ABSTRACT

A nuclear fuel handling powder container especially suitable for conveying nuclear fuel in powder form consisting of air-tight vacuum load/unload containers used in an overhead rail system and incorporating structure and means for inducing the extremely heavy and active powdered metal to flow from the container. A discharge hopper is incorporated which virtually eliminates any bridging or plugging beneath an aerating vane which serves as a feeder vane for the material and means are provided to prevent atmospheric air from entering or dust from leaving the container while vacuum lines for loading or unloading the container are being attached or withdrawn.

8 Claims, 7 Drawing Figures

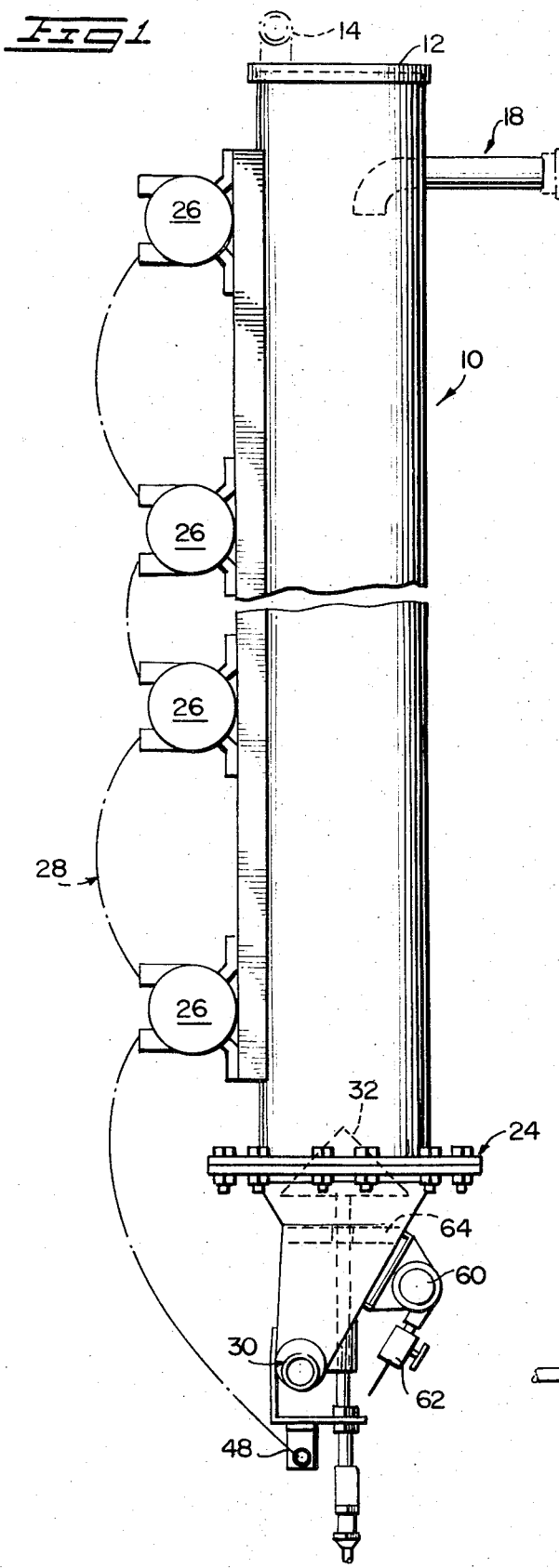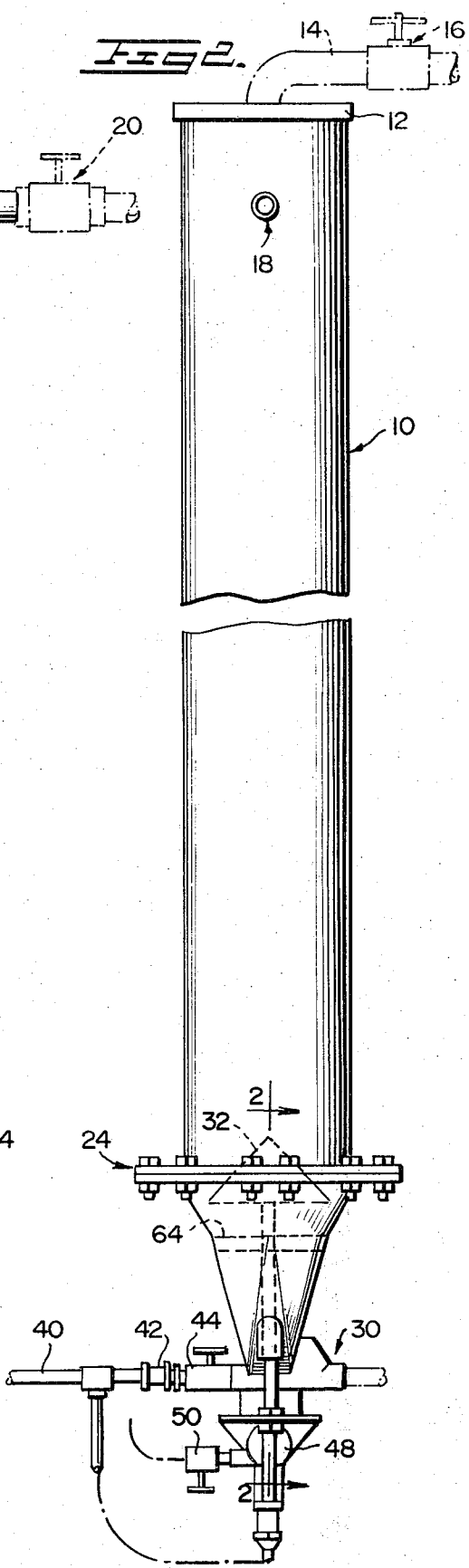

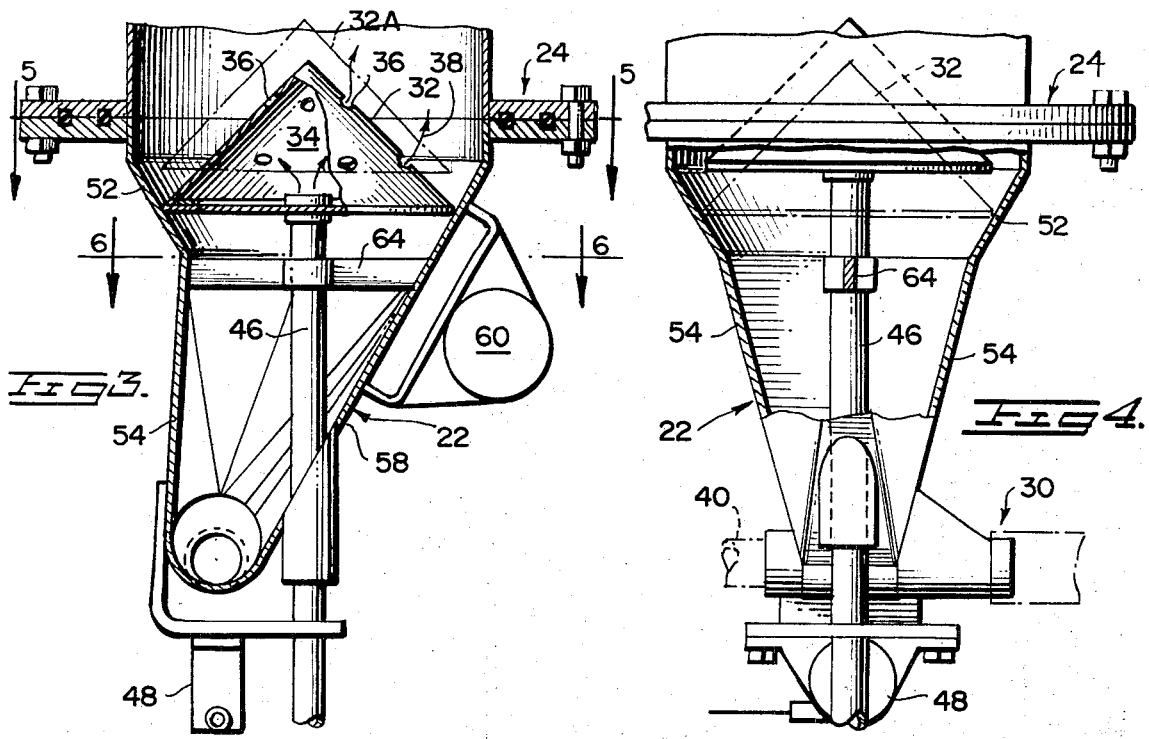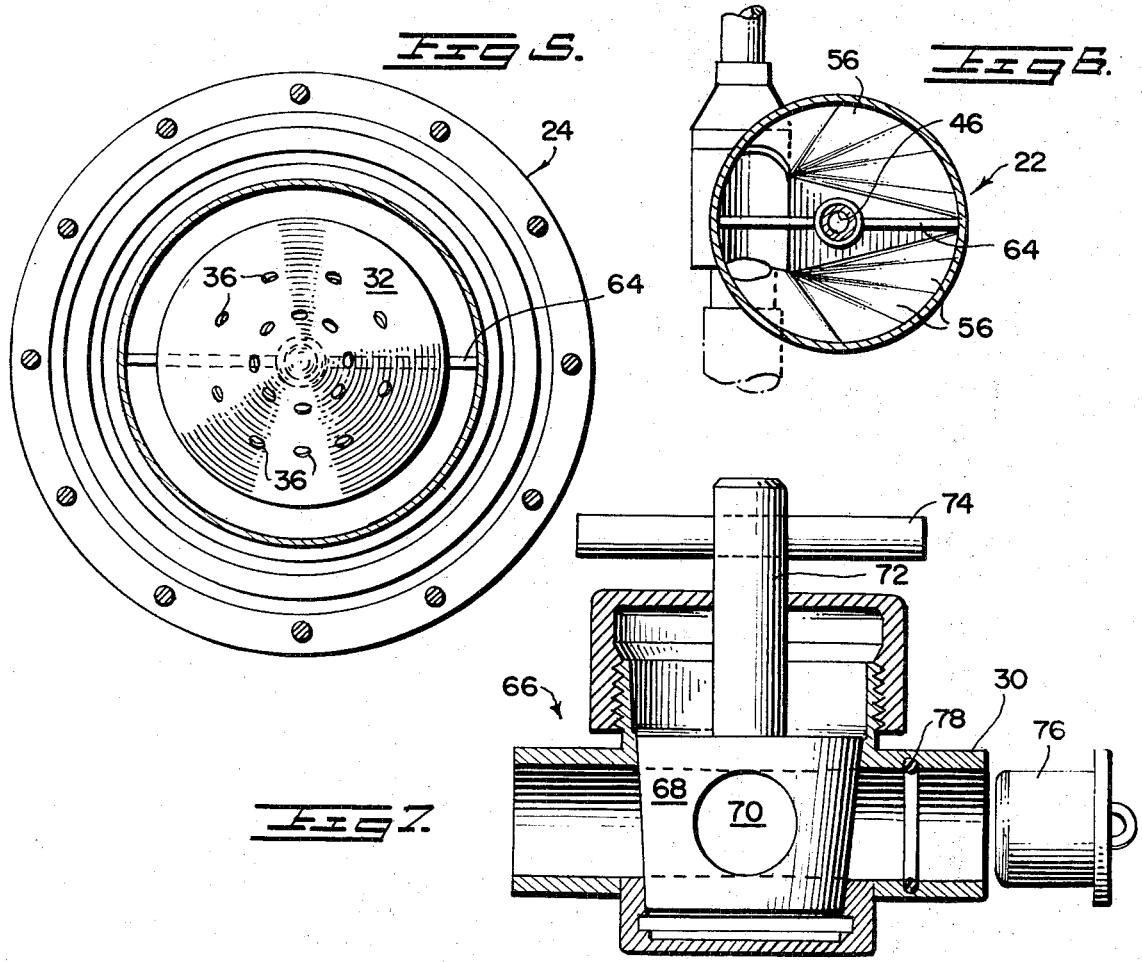

3,840,155

NUCLEAR FUEL HANDLING POWDER CONTAINER

BACKGROUND OF THE INVENTION

A method of conveying nuclear fuel in powder form by means of airtight vacuum load/unload containers on an overhead rail system is known. Problems have been encountered, however, in inducing the extremely heavy and active powdered metal to flow from the container used in such a method and system. while loading of the units is relatively satisfactory, discharge from the container presents problems due to the inherent characteristics of the powder, particularly after milling, and consists primarily of: a tendency of the material to pack and refuse to flow in the absence of some form of inducement; after flow is started, the material tends to move in large, irregular masses which overrun and plug pneumatic conveyors, particularly at the pickup point; and the material must be prevented from coming in contact with ambient atmosphere at any time due to moisture restrictions.

The present invention provides a solution to these previously existing problems.

SUMMARY OF THE INVENTION

The present invention consists in a nuclear fuel powder handling container of a type used in a method of conveying nuclear fuel in powder form by means of airtight vacuum load/unload containers on an overhead rail system wherein the design and structure are capable of inducing the extremely heavy and active powdered materials to flow from the container. These characteristics are primarily the result of an aerating vane in the container which forms a chamber for introducing high pressure dry air into the material thereabove in order to break up masses of the material, fluidize it and cause it to fall upon the vane, means additionally being provided for vibrating the vane which additionally serves to feed the vacuum pick-up point therebelow. The discharge hopper is so designed and shaped as to virtually eliminate any bridging or plugging below the aerating vane.

Additional objects and advantages of the invention will be more readily apparent from the following detailed description of an embodiment thereof when taken together with the accompanying drawings in which:

FIG. 1 is a side elevational view of an embodiment of the invention;

FIG. 2 is an end elevational view tken at right angles to FIG. 1;

FIG. 3 is an enlarged fragmentary detailed sectional view taken along line 3—3 of FIG. 2, detailing structure of the lower hoppered or discharge end of the apparatus;

FIG. 4 is an enlarged detailed fragmentary elevational view, parts being broken away, similar to FIG. 3 and at right angles thereto;

FIG. 5 is a horizontal sectional view taken along line 5—5 of FIG. 3;

FIG. 6 is a horizontal detailed sectional view taken along line 6—6 of FIG. 3; and FIG. 7 is a sectional view of a quick disconnect valve employed with the present invention.

Referring now in detail to the drawings there is shown, for illustrative purposes only, an embodiment of the invention consisting of a 300 pound, 10 inch diameter, vacuum load and discharge $UO_2$ powder container adapted for use in the method of conveying nuclear fuel in powder form by means of airtight vacuum load/unload containers on an overhead rail system.

The container generally designated 10 is of generally cylindrical configuration with a coacting top lid 12 and adapted for use with a vacuum lid and filter air-motor arrangement to be provided by a user and with valve connection 14, incorporating valve 16 of a type hereinafter described for connection to a vacuum line. A fill vent connection 18 opens into the interior of container 10 and is appropriately valved as at 20. A discharge hopper 22 is connected to the bottom of container 10 by means of bolted flanges at 24.

Four pneumatic vibrators 26 are connected along the side of container 10 and are placed in series by rubber hose sections 28, schematically shown, or the like, with air from one exhaust port entering the inlet of the next vibrator. Quick disconnect attachments at each station can be connected to plant air or the like. Adjustment of the air supply to each vibrator can be used to obtain a variation in frequency at each level to thus produce a more uniform feed and minimize packing. A discharge line 30 is connected into the bottom of discharge hopper 22. A conical feeder vane 32 is provided interiorally at the bottom of the container. The conical section is hollow and forms a chamber 34 for introducing high pressure dry air into the material thereabove through air pads or openings 36 with the air flow therethrough being indicated by arrows 38. The air pads are formed preferably from porous stainless steel filter material. The air is admitted from a source thereof through hose or tubing 40 via quick disconnect fittings 42 and valves 44 into and through a hollow stem 46 extending through a double O-ring gland. Air preferably is admitted in periodic high velocity jets of short duration in order to break up the masses of material, fluidize it, and cause it to fall upon the vane. In addition to the air jets, the vane is also provided with the capability of vibrating in order to feed the vacuum pick-up point therebelow. Vibration is effected by a pneumatic vibrator generally designated 48 and control valve 50 mounted on a cantilever bracket or the like on the outside of the container. Variation in feed rate of material from the container can be adjusted by adjusting air flow through the vibrator or adjusting the position of the vane in respect to the conical hopper section in the discharge hopper as appears hereinafter.

The material flowing past the vane 32 into the discharge hopper 22 trickles into the vacuum pick-up point at a uniform rate. The material will be free flowing at this point due primarily to the shape of the hopper. The hopper 22 has an upper conical section 52 which merges to and forms a transition to a four sided shape at 54 which comprise faired sections or sides indicated at 56 (FIG. 6). The sides thus form a faired chute and the most shallow chute side is approximately 30°, indicated at 58 and is provided with a small vibrator or wrapper 60. This wrapper or vibrator acts on the face to form a slide path, in effect on a main slide path, into and through the hopper to the discharge outlet. Action of vibrator 60 is controlled by valve 62 connected to plant air. The air flow into and through the vane 32 serves to lift the cone from the full line position shown in FIG. 3 to the phantom line position indicated at 32A and in conjunction with the vibration controls flow of material from the container into the discharge hopper 22. Conveying air into the vacuum pick-up is controlled by the regulating valve in the dry air lines. A support for the vane 32 is provided by cross member 64.

Preferably each flanged connection is sealed by two concentric O-rings with a sealant groove between connections for admitting sealant without dismantling the joint. Sealant material can be either a silicone or teflon compound.

Additionally, at each tubing connection a socket with O-ring and set screw for locking the tubing in place is provided as a minimum provision for sealing the container. The socket can be closed with a tubing size plug during handling and storage although it is recommended that in addition to the plug a valve be provided at each connection. At the vacuum nozzle a standard vacuum service ball valve has been found to be adequate. Where material flows through the nozzle, however, a special valve as shown in FIG. 7 is provided. The valve generally designated at 66 essentially is a full-bore lift plug valve with a rubber lined core. The plug body 68 is operatively connected in discharge line 30 and is shown in FIG. 7 in the closed position. The plug body 68 has opening 70 therethrough. To open the valve for flow therethrough the plug 68 is lifted by stem 72 and handle 74 and rotated 90° to an open position. Use of this valve eliminates or minimizes the need for special enclosures at loading and unloading stations. It additionally eliminates leakage caused by removing closure plug 76, which coacts with O-ring 78 for closure purposes, for inserting the tubing. In operation the plug 68 is in position and closed and plug 76 is in position. The plug is removed and tubing is inserted past the O-ring. The valve core body 68 is then lifted and turned to full open position. The tubing end is thrust through the core flow bore 70 and butted against the tubing end on the container side of the valve, thus creating a smooth uninterrupted conduit for conveying material either into or out of the container. The process is reversed for removing the tubing.

A sequence of operation would consist in loading with the container empty and all valves closed. The plug is removed from the inlet valve and turned to open position for connection to the tubing. The vacuum is initiated to pull vacuum on the container and powder will then enter the container. When a desired amount has entered, the vacuum unit is stopped and plug valve closed, the tubing removed and the cap replaced and locked. For discharge with a full container all valves are closed and the discharge tubing is connected into the discharge valve in a manner described above. The vacuum line is connected to a vacuum source to vent dry air admitted to the container. The vibrator air lines are connected using the quick disconnect pipe couplings and dry air supply is connected through the nozzles and the supply regulated at low pressure whereupon the power unit is started to pull powder out of the container hopper. The vibrators are actuated. Should plugging occur in the container pressure is increased and admitting short bursts of dry air through filter pads and into the powder. Severe plugging in the container can be controlled by increasing pressure and briefly admitting short bursts of dry air around the periphery of the vane and down through the discharge line. When the container is empty the initial condition is restored.

Manifestly, minor changes in details can be effected without departing from the spirit and scope of the invention as defined in and limited solely by the appended claims.

We claim:

1. A nuclear fuel handling powder container comprising:
   A. a hollow container body;
   B. a powder inlet opening in said body proximate the top thereof;
   C. a powder discharge hopper at the bottom of said body;
   D. a hollow conical shaped powder feeder vane having openings therethrough mounted in said body above said discharge hopper and forming a powder feed passage therebetween and said body into said discharge hopper;
   E. aerating means for passing air under pressure through said openings in said feeder vane into powder thereabove to break up masses of the material, fluidize the material, and cause it to fall upon siad vane and pass into said discharge hopper;
   F. means for vacuumizing said body interior to induce powder flow from a source into the container;
   G. vacuum operated powder withdrawal means operatively connectable with said discharge hopper for withdrawal of powder material therefrom;
   H. valve means for controlling powder inlet and outlet flow to and from said container, said valve including:
      i. a valve body having inlet and outlet powder flow conduits of cylindrical configuration;
      ii. a plenum chamber in said valve body interconnecting said inlet and outlet passages;
      iii. a plug body having an opening therethrough of the same size as said passageways; and
      iv. said plug rotatable in sid plenum chamber to intercommunicate said passageways for material flow therethrough or alternatively close the passageway openings into said plenum chamber to discontinue flow therethrough.

2. A nuclear fuel handling powder container as claimed in claim 1 and vibrating means associated with said vane to facilitate flow of powder therearound into the vacuum pickup point in said discharge hopper, the rate of vibration and the position of the vane in respect to the discharge hopper being adjustable for controlled variation in feed rate of material from the container.

3. A nuclear fuel handling powder container as claimed in claim 2, said powder discharge hopper including an upper conical section inwardly tapering from the inner cylindrical wall of said container body and merging to and forming a transition to a four sided faired chute including faired sides and defining a main slide path for material therethrough to the discharge outlet.

4. A nuclear fuel handling powder container as claimed in claim 3, wherein the sides forming a faired chute include a most shallow chute side at an angle of approximately 30° and a vibrator on said shallow chute side to facilitate controlled flow of material from the container into the discharge hopper.

5. A nuclear fuel handling powder container as claimed in claim 4, including a plurality of pneumatic vibrators connected along the side of said container and being connected in series, and adjustable air supply means for each vibrator operable to obtain a variation in frequency at the level of each said vibrator to produce a more uniform feed and minimize packing of powder therein.

6. A nuclear fuel handling powder container as claimed in claim 1, said plenum chamber and said plug body being of truncated conical mating configurations for sealing engagement of the plug body in said plenum chamber, said plug body being axially displaceable with respect to said plenum chamber to permit said rotation thereof to open and closed positions, said passageways and said opening respectively being sized to permit passage therethrough of discharge conduits for the powder, and a plug valve insertable in a said passageway for closure thereof.

7. A nuclear fuel handling powder container comprising:
A. a hollow container body;
B. a powder inlet opening into said body proximate the top thereof;
C. a powder discharge hopper at the bottom of said body;
D. means for vacuumizing said body interior to induce powder flow from a source into the container;
E. vacuum operated powder withdrawal means operatively connectable with said discharge hopper for withdrawal of powder material therefrom;
F. valve means for controlling powder inlet and outlet flow to and from said container, said valve including:
  i. a valve body having inlet and outlet powder flow conduits of cylindrical configuration;
  ii. a plenum chamber in said valve body interconnecting said inlet and outlet passages;
  iii. a plug body having an opening therethrough of the same size as said passageways; and
  iv. said plug rotatable in said plenum chamber to intercommunicate said passageways for material flow therethrough or alternatively close the passageway openings into said plenum chamber to discontinue flow therethrough.

8. A nuclear fuel handling powder container as claimed in claim 7, said plenum chamber and said plug body being of truncated conical mating configurations for sealing engagement of the plug body in said plenum chamber, said plug body being axially displaceable with respect to said plenum chamber to permit said rotation thereof to open and closed positions, said passageways and said opening respectively being sized to permit passage therethrough of discharge conduits for the powder, and a plug valve insertable in a said passageway for closure thereof.

* * * * *